(12) United States Patent
Wang et al.

(10) Patent No.: US 10,144,194 B2
(45) Date of Patent: Dec. 4, 2018

(54) METHODS AND APPARATUS TO VENT GAS AND VAPOR FROM A PANEL VIA VENTING CHANNELS FOR A DECORATIVE LAYER

(71) Applicant: The Boeing Company, Chicago, IL (US)

(72) Inventors: Xiaoxi Wang, Mukilteo, WA (US); John Wilde, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 221 days.

(21) Appl. No.: 15/153,297

(22) Filed: May 12, 2016

(65) Prior Publication Data

US 2017/0326837 A1 Nov. 16, 2017

(51) Int. Cl.
*B32B 3/30* (2006.01)
*B32B 7/12* (2006.01)
(Continued)

(52) U.S. Cl.
CPC .......... *B32B 7/12* (2013.01); *B32B 3/30* (2013.01); *B32B 27/06* (2013.01); *B32B 37/003* (2013.01); *B32B 37/0023* (2013.01); *B32B 37/12* (2013.01); *B32B 2305/72* (2013.01); *B32B 2307/734* (2013.01); *B32B 2398/10* (2013.01); *B32B 2405/00* (2013.01); *B32B 2451/00* (2013.01); *B32B 2605/003* (2013.01);
(Continued)

(58) Field of Classification Search
None
See application file for complete search history.

(56) References Cited

U.S. PATENT DOCUMENTS 2,268,477 A 12/1941 Elmendorf
2,664,833 A 1/1954 Armstrong et al.
(Continued)

FOREIGN PATENT DOCUMENTS

CH 498714 11/1970
CN 202115040 U * 1/2012
(Continued)

OTHER PUBLICATIONS

Machine Translation of JP 2005075953 A, Mar. 2005 (Year: 2005).*
(Continued)

*Primary Examiner* — Jeffrey A Vonch
(74) *Attorney, Agent, or Firm* — Hanley, Flight and Zimmerman, LLC

(57) ABSTRACT

Methods and apparatus to vent gas and vapor from a panel via venting channels for a decorative layer are disclosed. An example apparatus includes a decorative layer, an adhesive layer to couple the decorative layer to a panel, and a resin layer disposed between the decorative layer and the adhesive layer. The adhesive layer is coupled to a first side of the resin layer. The decorative layer is coupled to a second side of the resin layer. The first side of the resin layer defines venting channels to vent at least one of gas or vapor away from the decorative layer to deter the at least one of gas or vapor from exerting a pressure on the decorative layer to deter separation of a portion of the decorative layer from the resin layer. The venting channels have a depth to impede the adhesive layer from filling the venting channels.

18 Claims, 4 Drawing Sheets

(51) Int. Cl.
  *B32B 27/06* (2006.01)
  *B32B 37/12* (2006.01)
  *B32B 37/00* (2006.01)

(52) U.S. Cl.
  CPC ....... *B32B 2605/18* (2013.01); *B32B 2607/00* (2013.01); *Y10T 428/2457* (2015.01); *Y10T 428/24355* (2015.01); *Y10T 428/24479* (2015.01); *Y10T 428/24562* (2015.01); *Y10T 428/24612* (2015.01); *Y10T 428/28* (2015.01); *Y10T 428/2848* (2015.01)

(56) References Cited

U.S. PATENT DOCUMENTS

| | | | |
|---|---|---|---|
| 3,434,411 A | 3/1969 | Allen et al. | |
| 4,219,376 A * | 8/1980 | Roman | B32B 27/10 156/209 |
| 4,238,437 A * | 12/1980 | Rolston | B29C 39/42 264/102 |
| 4,350,545 A * | 9/1982 | Garabedian | B32B 37/1018 156/87 |
| 4,367,110 A * | 1/1983 | Yoshikawa | B32B 27/04 156/219 |
| 4,504,205 A | 3/1985 | Stofko | |
| 4,599,127 A | 7/1986 | Cannady, Jr. et al. | |
| 4,693,926 A * | 9/1987 | Kowalski | B32B 27/30 156/123 |
| 5,085,921 A * | 2/1992 | Jayarajan | B32B 27/06 156/219 |
| 5,589,016 A | 12/1996 | Hoopingarner et al. | |
| 5,624,728 A | 4/1997 | Hoopingarner et al. | |
| 5,698,153 A | 12/1997 | Hoopingarner et al. | |
| 5,806,796 A * | 9/1998 | Healey | B29C 44/1233 244/117 R |
| 5,976,671 A * | 11/1999 | Gleim | B32B 27/30 428/172 |
| 6,066,385 A * | 5/2000 | Kim | B32B 3/30 428/167 |
| 6,251,497 B1 | 6/2001 | Hoopingarner et al. | |
| 6,340,413 B1 | 1/2002 | Nilsson et al. | |
| 6,419,776 B1 | 7/2002 | Hoopingarner et al. | |
| 6,656,567 B1 * | 12/2003 | Abe | B32L 33/30 428/141 |
| 7,063,119 B1 | 6/2006 | Kim | |
| 8,097,108 B2 | 1/2012 | Wilde et al. | |
| 2002/0084975 A1 * | 7/2002 | Lin | B41M 7/0027 345/156 |
| 2002/0160680 A1 * | 10/2002 | Laurence | B32B 27/36 442/394 |
| 2002/0182957 A1 * | 12/2002 | Levenda | B32B 27/02 442/173 |
| 2003/0033779 A1 * | 2/2003 | Downey | A63C 19/04 52/403.1 |
| 2003/0077423 A1 * | 4/2003 | Flanigan | B32B 3/30 428/166 |
| 2003/0190458 A1 * | 10/2003 | Spiewak | B32B 3/00 428/156 |
| 2003/0219578 A1 * | 11/2003 | Jones | B29C 70/46 428/292.1 |
| 2004/0146696 A1 | 7/2004 | Jones | |
| 2004/0192137 A1 * | 9/2004 | Starkey | B29C 70/086 442/286 |
| 2004/0253414 A1 * | 12/2004 | Longobardi | B44D 2/005 428/156 |
| 2005/0088014 A1 * | 4/2005 | Woodson | B60R 13/01 296/193.07 |
| 2005/0255311 A1 * | 11/2005 | Formella | B29C 70/46 428/323 |
| 2006/0151857 A1 * | 7/2006 | Gasparoni | B32B 27/00 257/635 |
| 2006/0246796 A1 * | 11/2006 | Duffy | B29C 70/44 442/38 |
| 2006/0277807 A1 * | 12/2006 | Wilde | B32B 27/00 40/606.07 |
| 2007/0148410 A1 * | 6/2007 | Winner | B32B 38/14 428/172 |
| 2007/0218269 A1 * | 9/2007 | Kato | C09J 7/22 428/304.4 |
| 2008/0193695 A1 * | 8/2008 | Kato | C09J 7/403 428/41.8 |
| 2008/0237909 A1 * | 10/2008 | Bech | B22F 5/007 264/101 |
| 2009/0057947 A1 * | 3/2009 | Nemchick | B29C 33/424 264/258 |
| 2010/0139839 A1 | 6/2010 | Ridgard et al. | |
| 2010/0215907 A1 * | 8/2010 | Spires | B24C 1/06 428/156 |
| 2011/0014419 A1 * | 1/2011 | Simmons | B29C 70/20 428/114 |
| 2011/0042000 A1 * | 2/2011 | Wilde | B41M 3/006 156/277 |
| 2012/0045638 A1 * | 2/2012 | Waldman | B32B 38/04 428/316.6 |
| 2014/0120303 A1 * | 5/2014 | Wilde | B29C 63/481 428/116 |
| 2016/0089851 A1 | 3/2016 | Drexler et al. | |
| 2016/0250828 A1 * | 9/2016 | Wilde | B32B 37/14 428/196 |
| 2017/0326836 A1 | 11/2017 | Wilde et al. | |
| 2017/0326845 A1 | 11/2017 | Benham et al. | |
| 2017/0326858 A1 | 11/2017 | Wang | |
| 2017/0326859 A1 | 11/2017 | Wang et al. | |
| 2017/0326863 A1 | 11/2017 | Wang et al. | |

FOREIGN PATENT DOCUMENTS

| | | | | |
|---|---|---|---|---|
| DE | 19640263 A1 * | 4/1998 | | A43B 17/14 |
| DE | 102006054586 B3 * | 1/2008 | | B29C 59/007 |
| EP | 2085212 A1 * | 8/2009 | | B29C 70/465 |
| GB | 2174033 | 10/1986 | | |
| GB | 2228214 A * | 8/1990 | | G09F 3/02 |
| GB | 2491190 | 11/2012 | | |
| JP | 51024673 A * | 2/1976 | | |
| JP | 63042850 A * | 2/1988 | | G09F 3/02 |
| JP | 02088331 A * | 3/1990 | | |
| JP | 10030287 A * | 2/1998 | | |
| JP | 2000265589 A * | 9/2000 | | |
| JP | 2002138375 A * | 5/2002 | | |
| JP | 2004060061 A * | 2/2004 | | B29C 70/465 |
| JP | 2005075953 A * | 3/2005 | | |
| JP | 2005219504 A * | 8/2005 | | |
| JP | 2008037060 A * | 2/2008 | | |
| JP | 2011021094 A * | 2/2011 | | |
| JP | 2011206998 A * | 10/2011 | | |
| KR | 20110026567 A * | 3/2011 | | B29C 59/007 |

OTHER PUBLICATIONS

Machine Translation of JP 2011021094 A, Feb. 2011 (Year: 2011).*
European Patent Office, "Extended European Search Report," issued in connection with European Patent Application No. 17163790.3, dated Oct. 17, 2017, 7 pages.
European Patent Office, "Extended European Search Report," issued in connection with European Patent Application No. 17163795.2, dated Oct. 18, 2017, 13 pages.
WEINIG, "WEINIG Unimat 500: The All-Round Machine for Greater Flexibility in Profiling," retrieved from <https://web.archive.org/web/20160207205725/https://www.weinig.com/en/solid-wood/planing-machines-and-moulders/unimat-series/unimat-500.html> on Sep. 29, 2017, 3 pages.
3M, "200MP Micro-channel Laminating Adhesives. 467MC, 468MC, 467MCF and 468MCF", accessed at [http://kleylenta.ru/download/lenta/467mc.pdf] on Jun. 1, 2016, (3 pages).
United States Trademark and Patent Office, "Requirement for Election and/or Restriction," issued in connection with U.S. Appl. No. 15/153,338, dated Apr. 30, 2018, 7 pages.

(56) References Cited

OTHER PUBLICATIONS

United States Trademark and Patent Office, "Requirement for Election and/or Restriction," issued in connection with U.S. Appl. No. 15/153,324, dated Mar. 28, 2018, 5 pages.
European Patent Office, "Extended European Search Report," issued in connection with European Patent Application No. 17163795.2, dated Mar. 2, 2018, 14 pages.
Zhang et al., "Roll Manufacturing of Polymer Microfluidic Devices Using a Roll Embossing Process," Sensors and Actuators A, 230 (2015), pp. 156-169, 14 pages.
United States Trademark and Patent Office, "Non-Final Office Action," issued in connection with U.S. Appl. No. 15/153,324, dated Jun. 14, 2018, 42 pages.
United States Patent and Trademark Office, "Non-Final Office Action", issued in connection with U.S. Appl. No. 15/153,338, dated Aug. 27, 2018, 38 pages.

* cited by examiner

METHODS AND APPARATUS TO VENT GAS AND VAPOR FROM A PANEL VIA VENTING CHANNELS FOR A DECORATIVE LAYER

CROSS-REFERENCE TO RELATED APPLICATIONS

This patent relates to subject matter disclosed in U.S. patent application Ser. No. 15/153,252 entitled "Methods and Apparatus to Couple a Decorative Layer to a Core Layer of a Panel via a Barrier Layer", U.S. patent application Ser. No. 15/153,266 entitled "Methods and Apparatus to Couple a Decorative Layer to a Panel via a High-Bond Adhesive Layer", U.S. patent application Ser. No. 15/153,283 entitled "Methods and Apparatus to Couple a Decorative Composite Having a Reinforcing Layer to a Panel", U.S. patent application Ser. No. 15/153,324 entitled "Methods and Apparatus to Form Venting Channels on a Panel for a Decorative Layer", U.S. patent application Ser. No. 15/153,338 entitled "Methods and Apparatus to Remove Gas and Vapor from a Panel for a Decorative Layer", all of which were filed on May 12, 2016 and are incorporated herein by reference in their entireties.

FIELD OF THE DISCLOSURE

This patent relates generally to decorative layers and, more particularly, to methods and apparatus to vent gas and vapor from a panel via venting channels for a decorative layer.

BACKGROUND

Vehicles (e.g., aircraft, buses, trains, tractor-trailers, ships, etc.), buildings and/or other structures (e.g., billboards) include surfaces that are visible to the public. Oftentimes, these surfaces include decorative images for aesthetic, identification and/or advertising purposes. For example, some surfaces of aircraft include decorative images that identify an airline carrier associated with the aircraft. In some instances, the decorative images are formed on a decorative laminate that is coupled to the surface of the vehicle, building and/or other structure. A pocket of gas and/or vapor (e.g., water vapor) may form between the decorative laminate and the surface, thereby causing an adjacent portion of the decorative laminate to bubble.

SUMMARY

In one example, an apparatus includes a decorative layer, an adhesive layer to couple the decorative layer to a panel, and a resin layer disposed between the decorative layer and the adhesive layer. The adhesive layer is coupled to a first side of the resin layer. The decorative layer is coupled to a second side of the resin layer opposite the first side. The first side of the resin layer defines one or more venting channels to vent at least one of gas or vapor away from the decorative layer to deter the at least one of gas or vapor from exerting a pressure on the decorative layer to deter separation of a portion of the decorative layer from the resin layer. The venting channels of the resin layer have a depth greater than a first thickness of the adhesive layer to impede the adhesive layer from filling the venting channels.

In another example, an apparatus includes means for decorating a panel, means for coupling the means for decorating to the panel, and means for venting disposed between the means for decorating and the means for coupling. The means for coupling is coupled to a first side of the means for venting. The means for decorating is coupled to a second side of the means for venting opposite the first side. The means for venting is to vent at least one of gas or vapor away from the means for decorating to deter the at least one of gas or vapor from exerting a pressure on the means for decorating to deter separation of a portion of the means for decorating from the panel.

In another example, a method includes forming one or more venting channels on a first side of a resin layer, coupling a decorative layer to a second side of the resin layer opposite the first side, and coupling an adhesive layer to the first side of the resin layer to enable the decorative layer to couple to a panel. The adhesive layer has a thickness less than a depth of the venting channels to impede the adhesive layer coupled to the first side from filling the venting channels formed on the first side. The venting channels are to vent at least one of gas or vapor away from the decorative layer to deter the at least one of gas or vapor from exerting a pressure on the decorative layer to deter separation of a portion of the decorative layer from the resin layer.

BRIEF DESCRIPTION OF THE DRAWINGS

The figures are not to scale. Instead, to clarify multiple layers and regions, the thicknesses of the layers may be enlarged in the drawings. Wherever possible, the same reference numbers will be used throughout the drawing(s) and accompanying written description to refer to the same or like parts.

DETAILED DESCRIPTION

Figure 1:
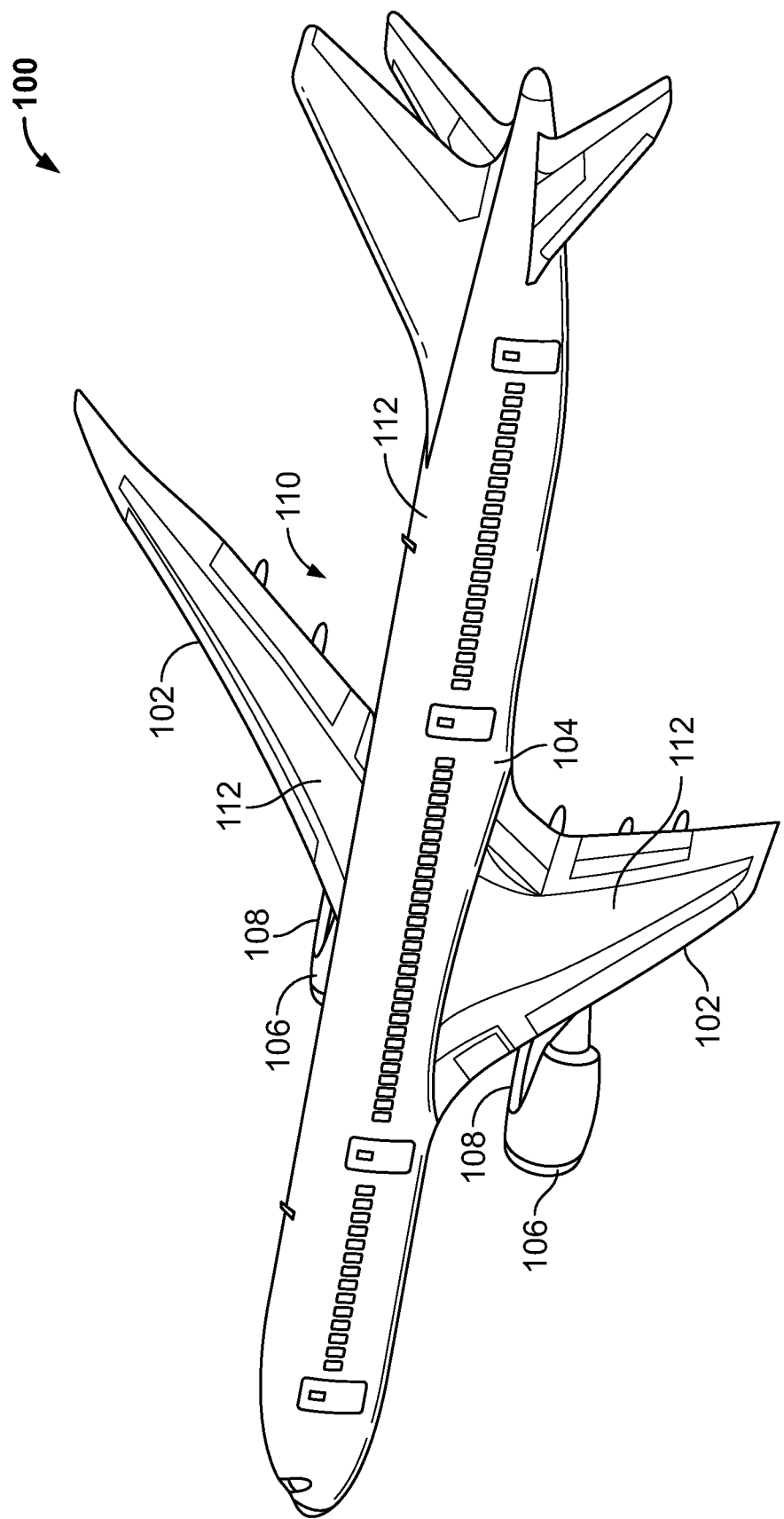
FIG. 1 depicts an example aircraft in accordance with the teachings herein.

Surfaces in public spaces (e.g., billboards, building walls, vehicle panels, etc.) oftentimes include decorative images for aesthetic, informational, and/or advertising purposes. For example, known aircraft and/or other vehicles (e.g., buses, trains, tractor-trailers, ships, etc.) often include decorative images on their surfaces for identification and/or advertising purposes. In some examples, the visible surfaces of aircraft interiors include decorative images that identify respective airline carriers associated with the aircraft.

Some known decorative images are formed on a decorative layer (e.g., a decorative laminate) that is coupled to a corresponding surface. For example, decorative layers are coupled to panels of aircraft via an adhesive layer. In some instances, a portion of the decorative layer or laminate may separate from the surface to which it is coupled. For example, a pocket of gas and/or vapor (e.g., water vapor) may form between the decorative laminate and the surface, thereby causing an adjacent portion of the decorative laminate to bubble. Such separation between the decorative laminate and the surface may be undesirable for aesthetic purposes (e.g., bubbling of the decorative laminate may be aesthetically unappealing) and/or may cause the decorative laminate to become damaged and/or to further separate (e.g., delaminate) from the surface over time.

In some instances, pockets of gas and/or vapor are entrapped between a decorative laminate and a surface of a panel (e.g., an interior surface in a compartment of the aircraft such as a surface of a bin, a lining, furnishings, etc.) when the decorative laminate is initially coupled to the surface. That is, the separation results from the decorative laminate not being laid flush with the surface when the decorative laminate is initially coupled to the surface.

In other instances, the pockets of gas and/or vapor that cause separation between the decorative laminate and the surface form as a result of the gas and/or vapor escaping from material of the panel and becoming trapped (e.g., to form a bubble) between the decorative laminate and the panel. When a decorative laminate is coupled to a panel of an aircraft, gas and/or vapor (e.g., water vapor) may be emitted from a core layer (e.g., a honeycomb core, a foam core, etc.) of the panel and subsequently become trapped between the decorative laminate and the surface of the panel. For example, the gas and/or vapor may escape and/or may be emitted from the core layer of the panel when there is a difference in pressure and/or temperature between the core layer of the panel and the environment exterior to the panel. For example, the gas and/or vapor may migrate from the core layer toward the decorative laminate when pressure closer to the core layer is greater than pressure closer to the decorative laminate. The gas and/or vapor becomes trapped between the decorative laminate as a result of the decorative laminate being composed of substantially impermeable and/or nonporous material that deters and/or impedes the gas and/or vapor of the core layer from traversing therethrough. The trapped gas and/or vapor creates an internal pressure between the decorative laminate and the panel that applies a concentrated force to the decorative laminate and/or the surface, thereby causing the decorative laminate to separate from the surface of the panel (e.g., from the interior surface in the aircraft compartment, etc.). Additionally or alternatively, the gas and/or vapor that is trapped between the decorative laminate and the panel may originate from an interaction (e.g., a chemical reaction, a physical reaction, etc.) between components of the panel and/or the decorative laminate such as between the core layer and a reinforcing layer of the panel, between the reinforcing layer and an adhesive coupled to the decorative laminate, etc.

To deter and/or impede gas and/or vapor from causing a portion of a decorative layer coupled to a panel from separating from the panel, the example methods and apparatus disclosed herein include one or more venting channels that vent gas and/or vapor (e.g., water vapor) away from the decorative layer. For example, the venting channels are formed in a resin layer disposed between the decorative layer and the panel. As a result, the venting channels deter and/or impede the gas and/or vapor emitted from the panel from reaching the decorative layer and creating an internal pressure between the decorative layer and a surface of the panel. Thus, the venting channels deter and/or impede the gas and/or vapor from exerting a pressure and/or a force on a portion of the decorative layer to deter and/or impede the decorative layer from separating from the panel (e.g., to deter and/or impede the decorative layer from bubbling).

In the examples disclosed herein, the resin layer defining the venting channels is disposed between the decorative layer and an adhesive layer that is to couple the decorative layer to the panel. For example, the adhesive layer is coupled to a first side of the resin layer, and the decorative layer is coupled to a second side of the resin layer opposite the first side. Thus, when the decorative layer is coupled to the panel via the adhesive layer, the venting channels are positioned between the panel and the decorative layer to enable the venting channels to vent gas and/or vapor that is emitted and/or which escapes from the panel away from the decorative layer. The example venting channels are defined by the first side of the resin layer to which the adhesive layer is coupled so that the venting channels are adjacent the panel when the adhesive layer is coupled to the panel. As a result, the venting channels deter and/or impede the gas and/or vapor emitted from the panel from reaching the decorative layer that is coupled to the opposing side of the resin layer. The venting channels are formed in the resin layer, for example, via a molding process and/or a scoring process. Further, the example venting channels extend to an outer edge of the resin layer to enable the gas and/or vapor to vent away from the decorative layer. In some examples, the venting channels include a first set of channels (e.g., a first set of parallel channels) and a second set of channels (e.g., a second set of parallel channels) that intersect the first set of parallel channels. For example, the first set of parallel channels are approximately perpendicular to the second set of parallel channels to form a grid of one or more venting channels that increases an amount of gas and/or vapor vented via the venting channels.

In some examples, the resin layer is composed of a semi-rigid thermoset resin material. The rigidity of this material further impedes the gas and/or vapor from separating a portion of the decorative layer from the panel. In other examples, the resin layer is composed of a flexible resin material that enables the decorative layer to couple to a curved surface. The resin layer may be cured prior to coupling the decorative layer to the panel to affect characteristics (e.g., rigidity) of the resin layer. Further, in some examples, the second side of the resin layer includes a texture (e.g., coarsened, roughened, embossed, imprinted, etc.) to affect an aesthetic characteristic of the decorative layer (e.g., to cause the decorative layer to have a coarsened, roughened, embossed and/or imprinted texture). Additionally or alternatively, a film layer is disposed between the resin layer and the adhesive layer on the first side of the resin layer. For example, the film layer is coupled to the resin layer to increase a rigidity of the decorative composite and/or to affect an aesthetic characteristic of the decorative layer. Further, the venting channels have a depth greater than a thickness of the adhesive layer (e.g., a first thickness) and a thickness of the film layer (e.g., a second thickness) to deter and/or impede the adhesive layer and/or the film layer from filling the venting channels that would otherwise deter and/or impede the venting channels from venting the gas and/or vapor away from the decorative layer.

As used herein, the terms "couple," "coupled," and "coupling" refer to a direct or indirect attachment of one object to another object (e.g., one layer to another layer). For example, a first object is directly attached and, thus, coupled to a second object if a surface of the first object contacts a surface of the second object without any other object disposed therebetween. A first object is indirectly attached and, thus, coupled to a second object if the first object does not directly contact the second object but, instead, is fixed to the second object via intermediate object(s) (e.g., layer(s)) that are positioned between the first and second objects.

Turning to the figures, FIG. 1 illustrates an example aircraft 100 including wings 102 (e.g., a right wing and a left wing) extending laterally outward from a fuselage 104. Each of the wings 102 of the illustrated example supports an aircraft engine 106 via a pylon 108. A compartment 110 (e.g., a cargo compartment, a passenger compartment, a flight deck, etc.) is disposed within the fuselage 104 of the illustrated example. The wings 102 and the fuselage 104 define an outer surface 112 of the aircraft 100.

Figure 2A:
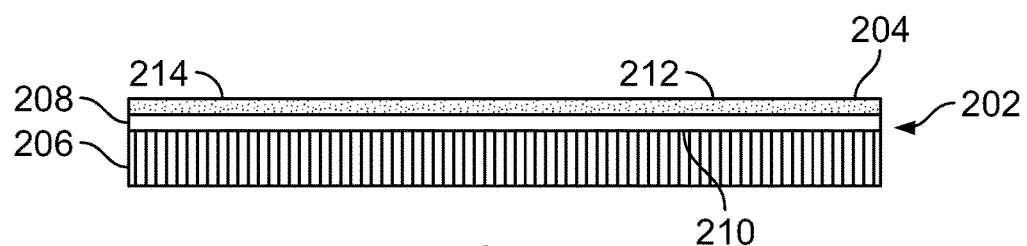
FIG. 2A is a cross-sectional view of a known decorative layer and a portion of a known panel.
Figure 2B:
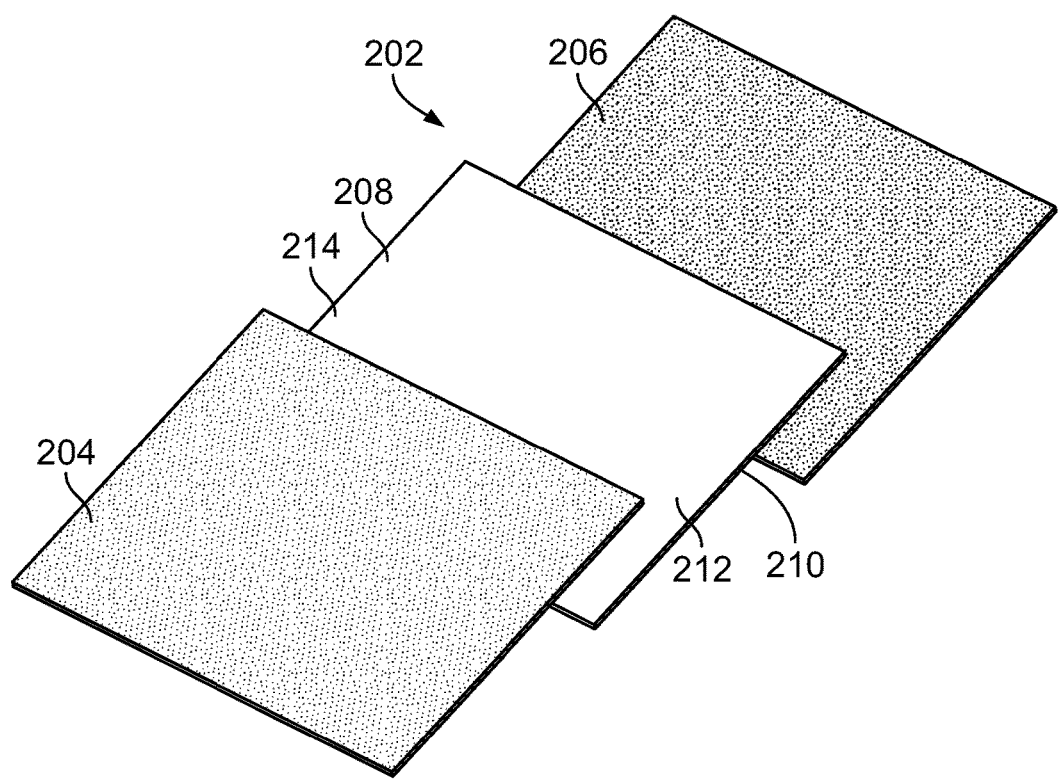
FIG. 2B is an exploded view of the known decorative layer and the portion of the known panel of FIG. 2A.

Before discussing the example decorative composites disclosed herein, a brief description of a known panel 202 and a known decorative layer 204 is provided in connection with FIGS. 2A and 2B. More specifically, FIG. 2A is a cross-sectional view of the known decorative layer 204 and a portion of the known panel 202, and FIG. 2B is an exploded view of the known decorative layer 204 and the portion of the known panel 202.

As illustrated in FIGS. 2A and 2B, the known panel 202 includes a core layer 206 and a reinforcing layer 208 coupled to the core layer 206. A first surface 210 of the reinforcing layer 208 engages the core layer 206, and an opposing second surface 212 defines a surface 214 of the panel 202. The reinforcing layer 208 of the known panel 202 may be composed of materials that are partially porous and/or permeable (e.g., resin, reinforcing fiber, etc.) such that some gas and/or vapor (e.g., water vapor) may traverse through the reinforcing layer 208. Further, while not shown in the portion of the known panel 202 illustrated in FIGS. 2A and 2B, another reinforcing layer engages another surface of the core layer 206 opposite the reinforcing layer 208 such that a sandwich-structured composite is formed by the reinforcing layer 208, the core layer 206, and the other opposing reinforcing layer.

Further, the known decorative layer 204 includes decorative features (e.g., colors, patterns, logos, text, etc.) that are to be displayed on the known panel 202. As illustrated in FIG. 2A, the decorative layer 204 is coupled to the surface 214 of the panel 202 to enable the decorative features of the decorative layer 204 to be displayed on the panel 202. For example, the decorative layer 204 is adhesively coupled to the second surface 212 of the reinforcing layer 208.

In some instances, gas and/or vapor (e.g., water vapor) is trapped within the core layer 206 of the panel 202 (e.g., trapped between the reinforcing layer 208 and the opposing reinforcing layer of a sandwich-structured composite of the panel 202). When a difference in pressure and/or temperature between the core layer 206 and the environment exterior to the panel 202 occurs (e.g., when pressure closer to the core layer 206 is greater than pressure closer to the decorative layer 204), the gas and/or vapor escape and/or are emitted from the core layer 206 of the panel 202. In other instances, gas and/or vapor emitted from the panel 202 may originate from an interaction (e.g., a chemical reaction, a physical reaction, etc.) between material of the core layer 206 (e.g., a honeycomb core, a foam core, resin, reinforcing fiber, etc.) and/or the decorative layer 204 (e.g., a decorative laminate, an adhesive layer, etc.).

Because the decorative layer 204 coupled to the panel 202 is composed of substantially impermeable and/or nonporous material, the vapor and/or gas that is emitted from the core layer 206 traverses through the reinforcing layer 208 and becomes trapped between the decorative layer 204 and the surface 214 of the panel 202. The trapped vapor and/or gas create an internal pressure that applies a concentrated force to an adjacent portion of the decorative layer 204 and/or the surface 214 of the panel 202. For example, the applied concentrated force pushes a portion of the decorative layer 204 away from the surface 214 of the panel 202, thereby causing the portion of the decorative layer 204 to separate from the panel 202. In other words, vapor and/or gas of the known panel 202 may form bubbles in the known decorative layer 204 that are aesthetically unappealing and/or which damage the decorative layer 204.

Figure 3:
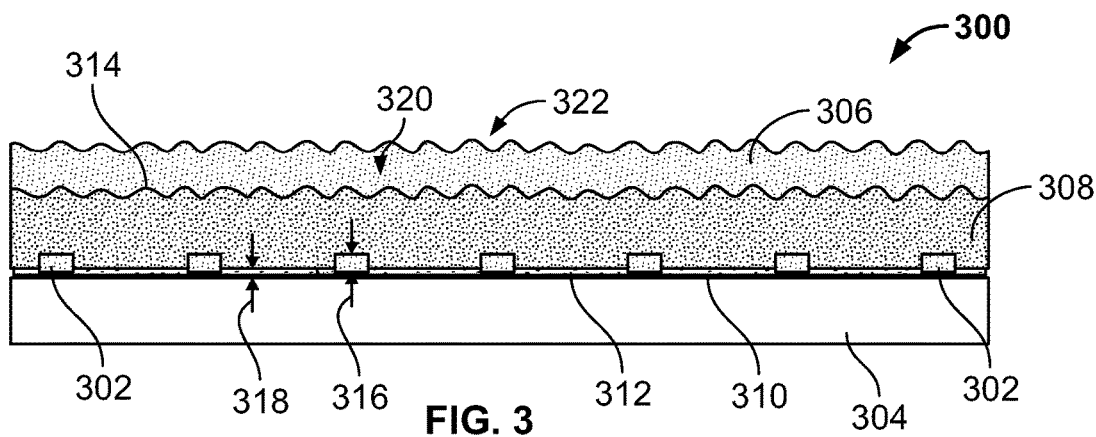
FIG. 3 is a cross-sectional view of an example decorative composite having one or more venting channels and coupled to a panel as disclosed in the teachings herein.
Figure 4:
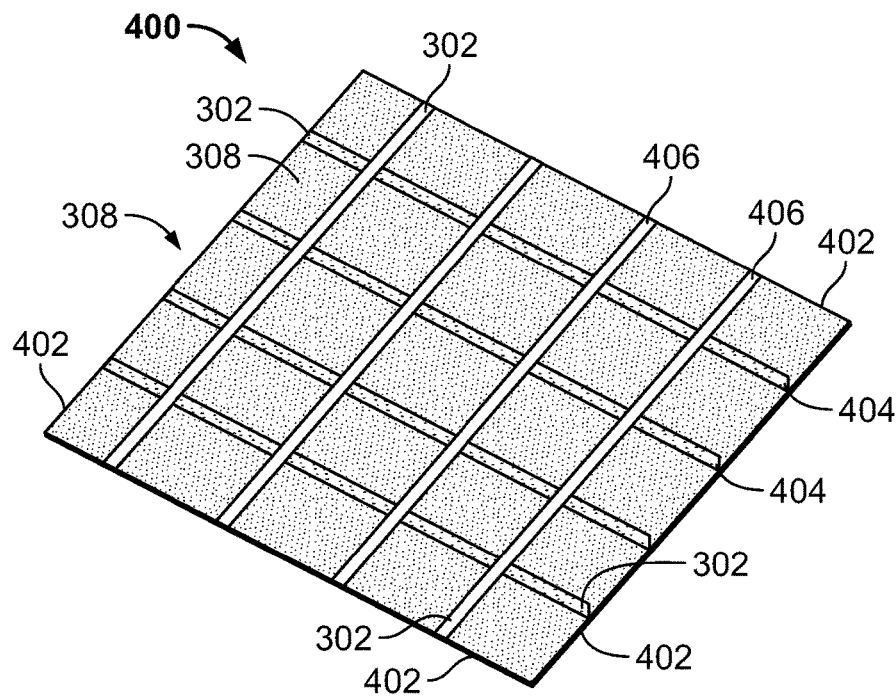
FIG. 4 is a perspective view of an example resin layer of the decorative composite that defines the venting channels of FIG. 3.
Figure 5:
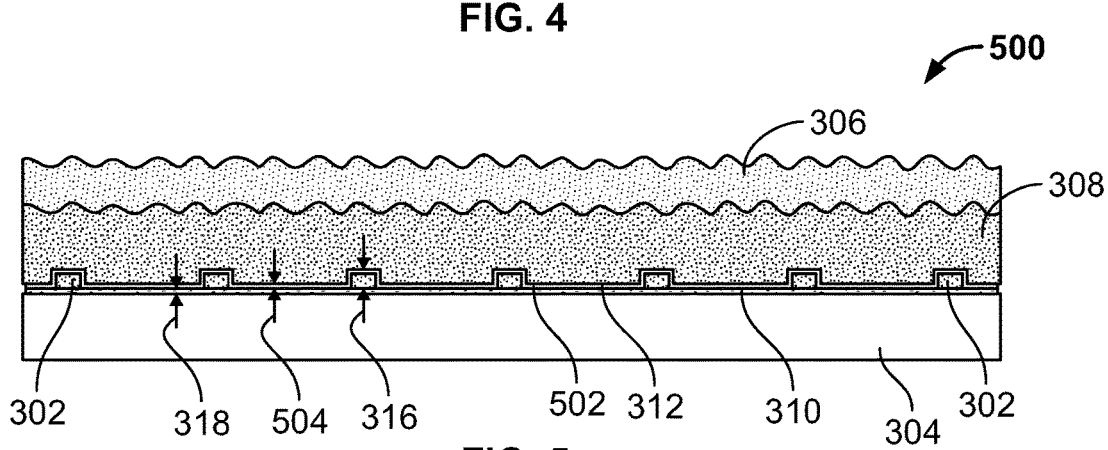
FIG. 5 is a cross-sectional view of another example decorative composite having example one or more venting channels and coupled to a panel as disclosed in the teachings herein.

FIGS. 3-5 depict one or more venting channels that vents gas and/or vapor (e.g., water vapor) away from a decorative layer coupled to a panel to deter and/or impede the gas and/or vapor from causing a portion of the decorative layer from separating from the panel (e.g. to deter bubbling of the decorative layer). The venting channels are formed in a resin layer disposed between the decorative layer and the panel. For example, the venting channels deter and/or impede the gas and/or vapor emitted from the panel from reaching the decorative layer and creating an internal pressure between the decorative layer and a surface of the panel. Thus, the venting channels deter and/or impede the gas and/or vapor from exerting a pressure and/or a force on a portion of the decorative layer to deter and/or impede decorative layer from bubbling.

FIG. 3 illustrates an example decorative composite 300 that includes one or more venting channels 302 and is coupled to a panel 304 in accordance with the teachings disclosed herein. The decorative composite 300 includes a decorative layer 306, a resin layer 308, and an adhesive layer 310. When the decorative composite 300 is coupled to the panel 304, as illustrated in FIG. 3, the venting channels 302 of the decorative composite 300 vent gas and/or vapor (e.g., water vapor) that originates from the panel 304 away from the decorative layer 306 to deter and/or impede the gas and/or vapor from causing a portion of the decorative layer 306 to separate from the panel 304 (e.g., the venting channels 302 deter and/or impede the decorative layer 306 from bubbling).

The panel 304 of the illustrated example from which gas and/or vapor (e.g., water vapor) originates forms a surface of a vehicle (e.g., the outer surface 112 of the aircraft 100 and/or a surface of a bin (e.g., a stow-bin), a lining (e.g., of a sidewall, a ceiling, etc.), furnishings (e.g., a monument, a closet, a crew-rest, a lavatory, etc.) located in the compartment 110 of the aircraft 100 of FIG. 1, etc.), a building and/or another structure on which decorative features are to be displayed for aesthetic, identification and/or advertising purposes. The panel 304 is composed of permeable and/or porous materials (e.g., honeycomb core, foam core, resin, reinforcing fiber, etc.) that enable the gas and/or vapor to escape and/or be emitted from the panel 304. For example, gas and/or vapor initially may be trapped within a core layer of the panel 304. When a difference in pressure and/or temperature between the panel 304 and the surrounding environment occurs (e.g., when pressure closer to the core layer is greater than pressure closer to the decorative layer 306), the initially trapped gas and/or vapor escapes and/or is emitted from the panel 304. Additionally or alternatively, the gas and/or vapor may originate from an interaction (e.g., a chemical reaction, a physical reaction, etc.) between the materials of the panel 304 (e.g., a honeycomb core, a foam core, resin, reinforcing fiber, etc.) when the panel 304 is formed.

As illustrated in FIG. 3, the resin layer 308 of the decorative composite 300 defines the venting channels 302 that vent the gas and/or vapor originating from the panel 304 away from the decorative layer 306. In the illustrated example, the adhesive layer 310 is coupled a first side 312 of the resin layer 308, and the decorative layer 306 is coupled to an opposing second side 314 of the resin layer 308. As a result, the venting channels 302 defined by the resin layer 308 are positioned between the panel 304 and the decorative layer 306 when the adhesive layer 310 couples the decorative composite 300 to the panel 304. Thus, the gas and/or vapor that escapes and/or is emitted from the panel 304 enters the venting channels 302 and is vented away from the decorative layer 306 via the venting channels 302 to deter and/or impede the gas and/or vapor from causing a portion of the decorative layer 306 to separate from the second side 314 of the resin layer 308. Additionally or alternatively, a coating of moisture absorption material (e.g., moisture scavenging material such as silica gel) is applied to the first side 312 of the resin layer 308 (e.g., in the venting channels 302) to capture and/or absorb gas and/or vapor emitted from the panel 304 to further deter and/or impede the gas and/or vapor from exerting the pressure on the decorative layer 306 and, thus, to further deter and/or impede a portion of the decorative layer 306 from separating from the panel 304.

The example venting channels 302 are defined by the first side 312 of the resin layer 308 and are spaced apart from the decorative layer 306 coupled to the opposing second side 314. In the illustrated example, the venting channels 302 defined by the first side 312 of the decorative layer 306 have a substantially rectangular cross-section. In other examples, the venting channels 302 may have a differently shaped cross-section, such as a semi-circular cross-section, a triangular cross-section, etc. Because the example venting channels 302 are defined by the first side 312 of the resin layer 308, the venting channels 302 are adjacent the panel 304 when the adhesive layer 310 coupled to the first side 312 of the resin layer 308 couples the decorative composite 300 to the panel 304. As a result, the venting channels 302 vent the gas and/or vapor emitted from the panel 304 away from the decorative layer 306 before the emitted gas and/or vapor approaches the decorative layer 306, thereby further deterring and/or impeding the gas and/or vapor from causing a portion of the decorative layer 306 to separate from the resin layer 308. That is, the example venting channels 302 of the illustrated example deter the gas and/or vapor from traversing through the resin layer 308 and reaching the decorative layer 306. Further, because the adhesive layer 310 is coupled to the first side 312 of the resin layer 308 that defines the venting channels 302, portions of the adhesive layer 310 may extend into and/or be partially disposed in the respective venting channels 302. To deter and/or impede the adhesive layer 310 from filling the venting channels 302 and, thus, prohibiting the venting channels 302 from venting the gas and/or vapor away from the decorative layer 306, the venting channels 302 have a depth 316 that is greater than a thickness 318 of the adhesive layer 310.

In the illustrated example, the resin layer 308 is composed of a thermoset resin material. For example, the resin layer 308 is composed of a semi-rigid thermoset material. The rigidity of the resin layer 308 distributes any concentrated forces that result from water vapor being trapped between the decorative layer 306 and the resin layer 308 to deter and/or impede a portion of the decorative layer 306 from separating from the resin layer 308 and/or to substantially reduce a distance of separation between the decorative layer 306 and the resin layer 308. Alternatively, the resin layer 308 is composed of a flexible thermoset material (e.g., an embossing resin) that enables the decorative composite 300 to couple to a curved surface. The resin layer 308 is cured, for example, prior to coupling the decorative composite 300 to the panel 304 to affect characteristics (e.g., aesthetic characteristics, a rigidity, etc.) of the resin layer. Further, as illustrated in FIG. 3, the second side 314 of the resin layer 308 defines a textured surface 320 (e.g., a first textured surface) that affects an aesthetic characteristic of the decorative layer 306 coupled to the second side 314. For example, the textured surface 320 creates a textured surface 322 (e.g., a second textured surface) of the decorative layer 306. The textured surface 320 of the resin layer 308 is formed, for example, via a molding process that forms the resin layer 308 and/or a secondary process after the resin layer 308 is formed.

FIG. 4 illustrates an example grid 400 of the venting channels 302 that are defined by the first side 312 of the resin layer 308. The grid 400 of the venting channels 302 distribute gas and/or vapor emitted from the panel 304 to reduce concentrated forces that may result from the gas and/or vapor being trapped between the decorative layer 306 and the resin layer 308. Thus, the venting channels 302 deter and/or impede a portion of the decorative layer 306 from separating from the resin layer 308 and/or substantially reduce a distance of separation between the decorative layer 306 and the resin layer 308. In the illustrated example, the venting channels 302 extend to outer edges 402 of the resin layer 308 to enable the gas and/or vapor to vent away from the decorative layer 306 (FIG. 3) and, more generally, the decorative composite 300 (FIG. 3) as a whole to further deter and/or impede a portion of the decorative layer 306 from separating from the resin layer 308. In other examples, one or more of the venting channels 302 that distribute the gas and/or vapor to reduce concentrated forces exerted on the decorative layer 306 may not extend to the outer edges 402 of the resin layer 308.

In the illustrated example, the venting channels 302 include a first set of one or more venting channels 404 and a second set of one or more venting channels 406. For example, the venting channels 302 of the first set of venting channels 404 are parallel to each other, and the venting channels 302 of the second set of venting channels 406 are parallel to each other. The first and second sets of venting channels 404, 406 intersect to form the grid 400 of the venting channels 302. The grid 400 of the intersecting venting channels 302 increases an amount of gas and/or vapor that the venting channels 302 are able to vent away from the decorative layer 306, for example, by increasing a surface area of the venting channels 302 and/or by providing venting paths in a plurality of directions. Further, the grid 400 increases the amount of gas and/or vapor that the venting channels 302 are able to vent away by providing alternative intersecting paths that enable the gas and/or vapor to traverse through one of the venting channels 302 if another of the venting channels 302 is partially or fully obstructed. In the illustrated example, the first set of venting channels 404 of the grid 400 is approximately perpendicular to the second set of venting channels 406 of the grid. In other examples, the first and second sets of venting channels 404, 406 are substantially non-perpendicular relative (e.g., intersect at an angle of about 30 degrees, 45 degrees, 60 degrees) to each other and/or do not intersect. For example, the first and second sets of venting channels 404, 406 may intersect at a substantially non-perpendicular angle to direct the gas and/or vapor toward and/or away from a portion of one of the outer edges 402 of the resin layer 308.

FIG. 5 illustrates another example decorative composite 500 that includes the venting channels 302 and a film layer 502 in accordance with the teachings herein. As illustrated in FIG. 5, the decorative composite 500 is coupled to the panel 304 via the adhesive layer 310.

The venting channels 302, the panel 304, the decorative layer 306, the resin layer 308, and the adhesive layer 310 of FIG. 5 are substantially similar or identical to those components having the same reference numbers in FIG. 3. Those components are described above in detail in connection with FIG. 3 and will not be described in further detail below.

As illustrated in FIG. 5, the film layer 502 is coupled to the first surface 312 of the resin layer 308, and the adhesive layer 310 is coupled to the film layer 502 that is coupled to the resin layer 308 such that the film layer 502 is positioned between the resin layer 308 and the adhesive layer 310. The film layer 502 is coupled to the resin layer 308 to increase a rigidity of the decorative composite 500 and/or to affect an aesthetic characteristic of the decorative layer 306. For example, the film layer 502 is composed of a plastic material such as polyvinyl fluoride (e.g., Tedlar®) and/or polyethylene terephthalate to affect the rigidity and/or aesthetics of the decorative composite 500. In some examples, the adhesive layer 310 and the film layer 502 are formed together (e.g., a 3M® laminating adhesive such as 467MC and 468MC that includes an adhesive layer and a liner) in which the film layer 502 is fixed to the adhesive layer 30 and the adhesive layer 310 includes microscopic channels. The microscopic channels of the adhesive layer 310 further enables vapor and/or gas emitted from the panel 304 to be vented away from the decorative layer 306 to further deter and/or impede bubbling of the decorative layer 306.

In the illustrated example, a thickness 504 of the film layer 502 is less than the depth 316 of the venting channels 302. Further, the depth 316 of the venting channels 302 is greater than a sum of the thickness 318 of the adhesive layer 310 and the thickness 504 of the film layer 502 to deter and/or impede the adhesive layer 310 and the film layer 502 from filling the venting channels 302 and, thus, prohibiting the venting channels 302 from venting the gas and/or vapor away from the decorative layer 306.

Figure 6:
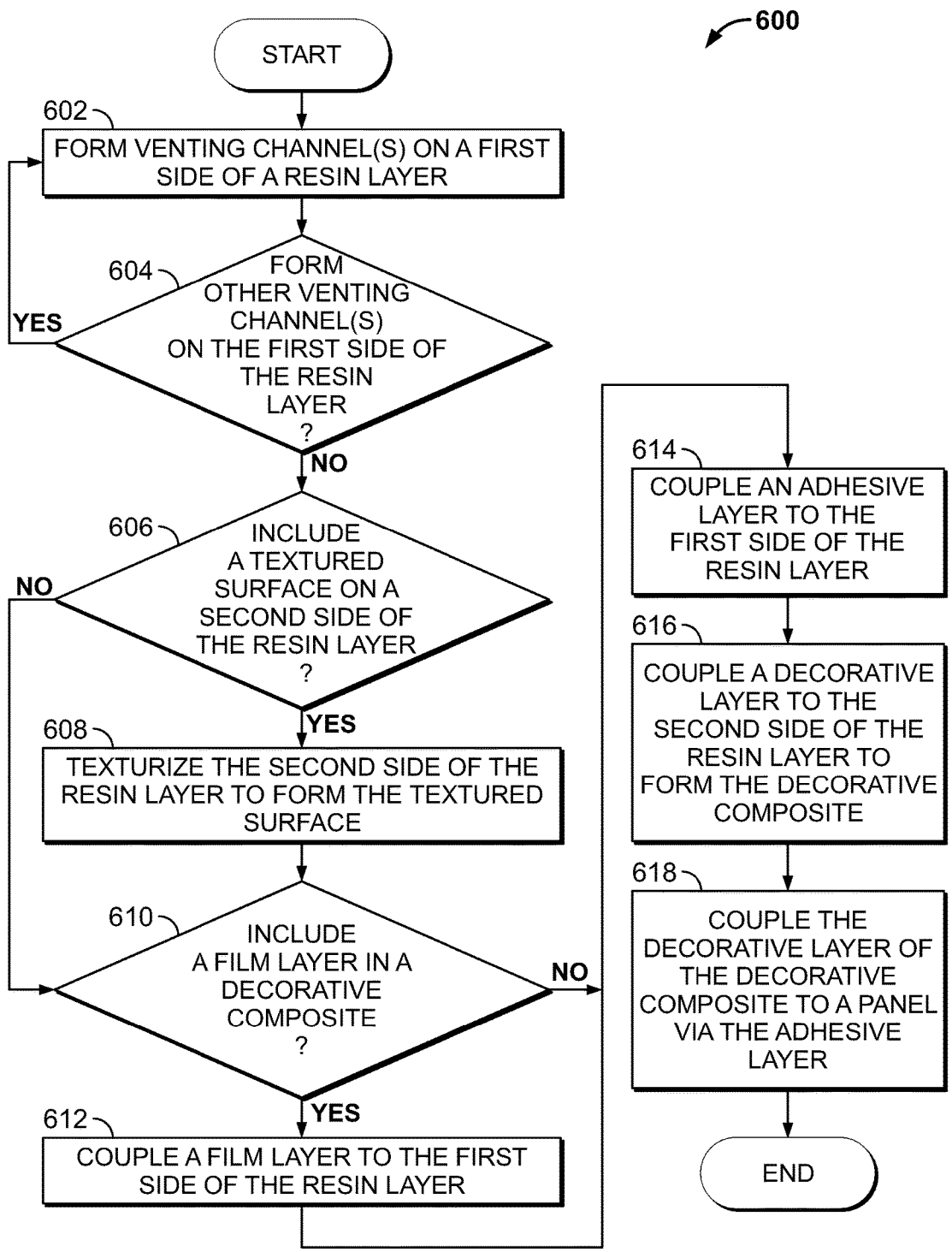
FIG. 6 is a flowchart representative of an example method to form the decorative composite of FIG. 3 and/or the decorative composite of FIG. 5 in accordance with the teachings herein.

FIG. 6 is a flowchart representative of an example method to form an example decorative composite having one or more venting channels in accordance with the teachings herein. Although the example method 600 is described with reference to the flowchart illustrated in FIG. 6, many other methods of forming the decorative composite having the venting channels may alternatively be used. For example, the order of execution of the blocks may be changed, and/or some of the blocks described changed, eliminated, and/or combined.

The method 600 for forming a decorative composite having one or more venting channels is discussed in connection with the decorative composite 300 of FIG. 3, the resin layer 308 of FIGS. 3-5, and/or the decorative composite 500 of FIG. 5. Further, because the method 600 may refer to the decorative composite 300 of FIG. 3, the resin layer 308 of FIGS. 3-5, and/or the decorative composite 500 of FIG. 5, components identified in FIGS. 3-5 having functions substantially similar or identical to the functions of components described below will not be described in detail again. Instead, the same reference numbers will be used for like structures.

The example method 600 disclosed herein starts at block 602 by forming one or more venting channels (e.g., the venting channels 302 of FIGS. 3-5) on a first side (e.g., the first side 312 of FIGS. 3-5) of a resin layer (e.g., the resin layer 308 of FIGS. 3-5). For example, a set of one or more parallel venting channels (e.g., the first set of venting channels 404 of FIG. 4, the second set of venting channels 406 of FIG. 4) are formed at block 602. The venting channels are formed in the resin layer via additive manufacturing (e.g., 3D printing), a molding process, a scoring process, a combination thereof and/or any other manufacturing process that is capable of producing channels in resin. At block 604, the example method includes determining whether to form other venting channels on the first side of the resin layer. If there are other venting channels to be formed (the other of the first set of venting channels 404 or the second set of venting channels 406 of FIG. 4), blocks 602, 604 are repeated until no other venting channels are identified.

At block 606, the example method 600 includes determining whether to include a textured surface (e.g., the textured surface 320 of FIG. 3) on a second side (e.g., the second side 314 of FIG. 3) of the resin layer. If the resin layer is to include the textured surface, the second side of the resin layer is texturized (e.g., coarsened, roughened, embossed, imprinted, etc.) to form the textured surface (block 608). For example, the second side is texturized via a molding process of the resin layer and/or a secondary process after the resin layer 308 is formed.

Upon texturizing the second side of the resin layer or upon determining that the resin layer is not to include the textured surface, the example method 600 includes determining whether to include a film layer (e.g., the film layer 502 of FIG. 5) in a decorative composite (e.g., the decorative composite 300 of FIG. 3, the decorative composite 500 of FIG. 5) (block 610). If the film layer is to be included, the film layer is coupled to the first side of the resin layer at block 612. In some examples, the method 600 executes blocks 602, 604 in parallel to blocks 606, 608, 610, 612.

Upon coupling the film layer to the resin layer or upon determining that the film layer is not to be included in the decorative composite, an adhesive layer (e.g., the adhesive layer 310 of FIGS. 3 and 5) is coupled to the first side of the resin layer (block 614). For example, if the film layer is included in the decorative composite, the adhesive layer is coupled to the resin layer via the film layer. At block 616, a decorative layer (e.g., the decorative layer 306 of FIGS. 3 and 5) is coupled to the second side of the resin layer to form the decorative composite. Further, at block 618, the example method 600 includes coupling the decorative layer of the decorative composite to a panel (e.g., the panel 304 of FIGS. 3 and 5) via the adhesive layer.

Although certain example methods and apparatus have been described herein, the scope of coverage of this patent is not limited thereto. On the contrary, this patent covers all methods, apparatus and articles of manufacture fairly falling within the scope of the amended claims either literally or under doctrine of equivalents.

What is claimed is:

1. An apparatus comprising:
a decorative layer;
an adhesive layer to couple the decorative layer to the panel;
a resin layer disposed between the decorative layer and the adhesive layer; and
a film layer coupled to the first side of the resin layer and disposed between the adhesive layer and the resin layer, the decorative layer coupled to a second side of the resin layer opposite the first side, the first side of the resin layer defining one or more venting channels to vent at least one of gas or vapor away from the decorative layer to deter the at least one of gas or vapor from exerting a pressure on the decorative layer to deter separation of a portion of the decorative layer from the resin layer, the venting channels having a depth greater than a thickness of the adhesive and less than a maximum thickness of the resin layer.

2. The apparatus of claim 1, wherein the resin layer is composed of a semi-rigid thermoset resin material to further deter separation of the portion of the decorative layer from the resin layer.

3. The apparatus of claim 1, wherein the resin layer is composed of a flexible resin material to enable the decorative layer to couple to a curved surface.

4. The apparatus of claim 1, wherein the venting channels extend to an outer edge of the resin layer to enable the at least one of gas or vapor to vent away from the decorative layer.

5. The apparatus of claim 1, wherein the film layer has a second thickness, the depth of the venting channels being greater than the first thickness of the adhesive layer and the second thickness of the film layer.

6. The apparatus of claim 1, wherein the second side of the resin layer includes a textured surface to affect an aesthetic characteristic of the decorative layer.

7. The apparatus of claim 6, wherein the textured surface of the second side of the resin layer is at least one of coarsened, roughened, embossed, or imprinted to cause the decorative layer coupled to the resin layer to be at least one of coarsened, roughened, embossed, or imprinted.

8. The apparatus of claim 1, wherein the venting channels include a first set of parallel channels.

9. The apparatus of claim 8, wherein the venting channels include a second set of parallel channels intersecting the first set of channels.

10. The apparatus of claim 9, wherein the second set of channels are approximately perpendicular to the first set of channels.

11. A method comprising:
forming one or more venting channels on a first side of a resin layer;
coupling a film layer to the first side of the resin layer;
coupling a decorative layer to the second side of the resin layer opposite the first side; and
coupling an adhesive layer to the film layer to enable the decorative layer to couple to a panel, the film layer disposed between the adhesive layer and the resin layer, the venting channels to vent at least one of gas or vapor away from the decorative layer to deter the at least one of gas or vapor from exerting a pressure on the decorative layer to deter separation of a portion of the decorative layer from the resin layer, the venting channels having a depth greater than a thickness of the adhesive and less than a maximum thickness of the resin layer.

12. The method of claim 11, further including curing the resin layer prior to coupling the decorative layer to the panel.

13. The method of claim 11, wherein forming the venting channels includes forming a first set of channels.

14. The method of claim 13, wherein forming the venting channels includes forming a second set of channels intersecting the first set of channels.

15. The method claim 11, wherein forming the venting channels includes at least one of molding the venting channels or scoring the venting channels on the first side of the resin layer.

16. The method of claim 11, further including texturizing the second side of the resin layer to affect an aesthetic characteristic of the decorative layer.

17. The method of claim 16, wherein texturizing the second side of the resin layer affects a texture of the decorative layer coupled to the second side of the resin layer.

18. The method of claim 11, wherein the film layer has a thickness less than a depth of the venting channels.

* * * * *